United States Patent
Gong et al.

(10) Patent No.: US 11,135,529 B1
(45) Date of Patent: Oct. 5, 2021

(54) PARAMETER OPTIMIZATION METHOD FOR DOUBLE-FIELD COUPLING DEHYDRATOR

(71) Applicant: CHONGQING TECHNOLOGY AND BUSINESS UNIVERSITY, Chongqing (CN)

(72) Inventors: Haifeng Gong, Chongqing (CN); Bao Yu, Chongqing (CN); Xianming Zhang, Chongqing (CN); Ye Peng, Chongqing (CN)

(73) Assignee: CHONGQING TECHNOLOGY AND BUSINESS UNIVERSITY, Chongqing (CN)

( * ) Notice: Subject to any disclaimer, the term of this patent is extended or adjusted under 35 U.S.C. 154(b) by 0 days.

(21) Appl. No.: 17/340,056

(22) Filed: Jun. 6, 2021

Related U.S. Application Data

(62) Division of application No. 16/807,963, filed on Mar. 3, 2020.

(30) Foreign Application Priority Data

Mar. 15, 2019 (CN) .......................... 201910196468.5

(51) Int. Cl.
 *B01D 17/06* (2006.01)
 *B01D 17/02* (2006.01)
 (Continued)

(52) U.S. Cl.
 CPC ......... *B01D 17/06* (2013.01); *B01D 17/0217* (2013.01); *C10G 33/02* (2013.01);
 (Continued)

(58) Field of Classification Search
 CPC ..... B01D 17/06; B01D 17/0217; C10G 33/02
 See application file for complete search history.

(56) References Cited

U.S. PATENT DOCUMENTS

| 5,352,343 A | 10/1994 | Bailes et al. |
| 5,643,469 A | 7/1997 | Prevost et al. |

(Continued)

FOREIGN PATENT DOCUMENTS

| CN | 101386790 A | 3/2009 |
| CN | 102373075 A | 3/2012 |

(Continued)

OTHER PUBLICATIONS

Ye Peng, Tao Liu, et al., "Dehydration of emulsified lubricating oil by three fields: swirl centrifugal field, pulse electric field and vacuum temperature field" Appl. Pertrochem. Res. 2016, p. 389-385. (Year: 2016).

(Continued)

*Primary Examiner* — Brian W Cohen

(57) ABSTRACT

A double-field coupling dehydrator and an optimization method for parameters. Parameters to be optimized is determined. Simulations to the double-field coupling dehydrator is carried out according to the parameters to be optimized, individually. Optimal ranges of the parameters to be optimized are determined according to simulation results. Optimized parameter combinations of the parameters to be optimized are determined separately. Separation efficiencies of the double-field coupling dehydrator under different optimized parameter combinations are obtained to determine an optimal parameter combination. The method considers both influences of single parameters and interactions between the parameters on the separation efficiency. Based on numerical simulation results of the double-field coupling dehydrator, these influences are analyzed by a software Design-Expert to obtain an optimal parameter combination.

5 Claims, 5 Drawing Sheets

(51) Int. Cl.
*C10G 33/02* (2006.01)
*C10G 33/06* (2006.01)
*C10M 175/00* (2006.01)

(52) U.S. Cl.
CPC ....... *C10G 33/06* (2013.01); *C10M 175/0066* (2013.01); *C10G 2400/10* (2013.01)

(56) References Cited

U.S. PATENT DOCUMENTS

| | | |
|---|---|---|
| 5,714,048 A | 2/1998 | Edmondson |
| 2007/0272818 A1 | 11/2007 | Gou |
| 2015/0192294 A1 | 7/2015 | Mooney et al. |

FOREIGN PATENT DOCUMENTS

| | | |
|---|---|---|
| CN | 103336031 A | 10/2013 |
| CN | 204661634 U | 9/2015 |
| CN | 205803406 U | 12/2016 |
| CN | 107704423 A | 2/2018 |
| CN | 208166956 U | 11/2018 |
| CN | 208209865 U | 12/2018 |
| SU | 589003 A1 | 1/1978 |

OTHER PUBLICATIONS

Gong et al "Simulation on performance of a demulsification and dewatering device with coupling double fields: Swirl centrifugal field and hich-voltaqe electric field" Separation and Purification Technology, 207, 2018, p. 124-132. (Year 2018).

Peng Ye, "Research on Unit Seperation Characteristics and Simulation Analysis of Three-field Demulsification and Dehydration Equipment for Wasted Oil". Chinese Doctoral Dissertation Full-text Database Engineering Science and Technology Series I, Feb. 15, 2018(2): p. 27,29,120-121.

Zhang Xiuhua et al., Parameter optimization experiment ofadjustable five rollers shrimp peeling machine[J]. Transactions of the Chinese Society ofAgricultural Engineering (Transactions of the CSAE), 2016, 32(15): 248-249, 252. (in Chinese with English abstract).

Gong,Haifeng et al., Numerical Analysis on Separation of Emulsified Waste Oil by Electric Field With a Double-Field Cupling Device, Acta Petrolei Sinica (Petroleum Processing),Jan. 31, 2019, 35(1):119-127.

Gong,Haifeng et al., Three-fields coupled procedure and equipment for demulsification and dehydration of waste oil, Modern chemical industry, Jan. 31, 2016, 36(1): 164-167.

Luiz G. M et al., Performance of Hydrocyclones With Different Geometries, The Canadian Journal of Chemical Engineering, Mar. 30, 2011 (89): p. 655-662.

Gong,Haifeng et al., Influence of electric field on water-droplet separated from emulsified oil in a double-field coupling device, Colloids and Surfaces A, Apr. 27, 2018 (550): p. 27-36.

Gong,Haifeng et al., Demulsilication Device of Waste Oil by Coupled Double Fields and Structural Optimization, Fluid machinery, Nov. 30, 2016, 44(11): 49-52.

PARAMETER OPTIMIZATION METHOD FOR DOUBLE-FIELD COUPLING DEHYDRATOR

CROSS-REFERENCE TO RELATED APPLICATIONS

This application is a divisional of U.S. application Ser. No. 16/807,963, now pending, which claims the benefit of priority from Chinese Patent Application No. 201910196468.5, filed on Mar. 15, 2019. The content of the aforementioned application, including any intervening amendments thereto, is incorporated herein by reference in its entirety.

TECHNICAL FIELD

This application relates to waste oil treatment, and more particularly to a double-field coupling dehydrator and the related parameter optimization.

BACKGROUND

Due to various factors, lubricating oils will be polluted by water during processes of transportation, storage and long-term usage, which causes oil deterioration, thereby generating waste lubricating oils.

Currently, the waste lubricating oil is mainly treated by direct discharge, direct combustion and recycling, where recyclable waste lubricating oils account for about 40% of total consumed lubricating oils, which is of great significance for reducing energy shortage, saving resources and protecting environment. Among multiple recycling methods, demulsification and dehydration of emulsions are very important. However, various single methods have limitations for waste oil emulsions with high water contents and complex components in terms of processing cost, energy and time consumption. So a developing trend is to achieve highly efficient demulsification and dehydration of emulsions by reasonably coupling or integrating two or more methods.

In general, the best parameters are obtained based on results of experiments or numerical simulations by changing a single parameter or type. However, there is a non-linear relationship between various parameters of the device, so the results obtained by general optimization methods are difficult to meet the requirements. It is more reasonable to obtain optimal parameters by combinatorial optimization of several parameters.

SUMMARY

An object of the invention is to provide a double-field coupling dehydrator and an optimization method for parameters thereof. The dehydrator is a coupling demulsification and dehydration device that integrates a high-voltage electric field and a cyclone centrifugal field, and realizes the efficient and rapid treatment of waste oil emulsions.

To achieve the object, the invention adopts the following technical solutions.

The present invention provides a double-field coupling dehydrator, comprising an overflow pipe, a plurality of inlets, a straight pipe, a first truncated cone, a second truncated cone and an underflow pipe;

wherein the overflow pipe and the inlets are provided on the straight pipe; the inlets are arranged on an outer wall of the straight pipe and are tangential to a wall of the straight pipe so as to allow a liquid to enter the straight pipe at a certain speed and rotate along an inner wall of the straight pipe; the overflow pipe is arranged along an axis of the straight pipe; a high-voltage electric field is arranged between an outer wall of the overflow pipe in the straight pipe and the inner wall of the straight pipe; the straight pipe, the first truncated cone, the second truncated cone and the underflow pipe are connected sequentially.

In some embodiments, the outer wall of the overflow pipe is provided with a positive electrode of a high-voltage power, and the inner wall of the straight pipe is provided with a negative electrode of the high-voltage power, so that the high-voltage electric field is formed between the outer wall of the overflow pipe and the inner wall of the straight pipe.

In some embodiments, at least two inlets are provided on the straight pipe in an symmetrical manner.

In some embodiments, the straight pipe, the first truncated cone, the second truncated cone and the underflow pipe are connected by welding to form a one-piece structure; and the overflow pipe and the straight pipe are connected via bolts.

In some embodiments, a joint between the first and second truncated cones has a nominal diameter D of 20-22 mm; the first truncated cone has a first cone angle of 20°-22°, and the second truncated cone has a second cone angle $\alpha$ of 5°-6°.

The invention further provides a parameter optimization method for a double-field coupling dehydrator, comprising:
 determining parameters to be optimized;
 simulating the double-field coupling dehydrator according to the determined parameters individually;
 determining an optimal range of individual parameters according to simulation results;
 determining combinations of the optimized parameters within the optimal range;
 simulating the double-field coupling dehydrator according to the determined parameter combinations individually;
 obtaining separation efficiencies of the double-field coupling dehydrator under individual optimized parameter combinations; and
 determining an optimal parameter combination according to the separation efficiencies of the double-field coupling dehydrator.

In some embodiments, the step of determining the optimal parameter combination comprises the following steps:
 establishing functional relationships between the optimized parameter combinations and the separation efficiencies, separately;
 carrying out a significance analysis for a model of the optimized parameter combinations according to the functional relationships;
 determining whether each of the optimized parameter combinations satisfies requirements according to the significance analysis; if not, returning to the previous step for the significance analysis of other optimized parameter combinations; if yes, determining the optimized parameter combinations;
 analyzing influences of interactions of the optimized parameter combinations on the separation efficiencies; and
 determining the optimal parameter combination.

In some embodiments, the parameters to be optimized of the double-field coupling dehydrator comprise a nominal diameter D, a first cone angle $\beta$ and a second cone angle $\alpha$.

In some embodiments, a joint between first and second truncated cones has a nominal diameter D of 20-22 mm; the first truncated cone has a first cone angle $\beta$ of 20°-22°, and the second truncated cone has a second cone angle $\alpha$ of 5°-6°.

In some embodiments, a multiple quadratic regression model of the functional relationships between the optimized parameter combinations and the separation efficiencies is established and calculated according to the following equations;

$$E_{dw}=266.26-8.798x_1 12.43x_2-1.197x_3+0.799x_1x_2+0.528x_1x_3+0.166x_2x_3+0.101x_2^2-0.12x_3^2;$$

$$E_{do}=1716.68+11.68x_1-29.9x_2-126.5x_3+3.11x_1x_2-8.13x_1x_3-2.28x_2x_3+7.72x_1^2+1.43x_2^2+5.22x_3^2;$$

wherein $x_1$, $x_2$ and $x_3$ correspond to $\alpha$, $\beta$ and D, respectively; $E_{dw}$ is the dehydration rate (%); $E_{do}$ is the deoiling rate (%); the optimal condition is that the dehydration rate and deoiling rate of the double-field coupling dehydrator are maximal at the same time; and the optimal parameter combination is obtained.

The invention has the following beneficial effects.

The invention provides a double-field coupling dehydrator, and the parameter optimization method for the dehydrator are obtained by analyzing relationships between parameters and separation efficiencies of the double-field coupling dehydrator. The optimization method takes into account both influences of single parameters on the separation efficiency and influences of interactions between parameters on the separation efficiency. Based on numerical simulation results of the double-field coupling dehydrator, these influences are analyzed by a software Design-Expert to obtain an optimal parameter combination of the double-field coupling dehydrator.

The invention achieves an optimization of structural or operation parameter combinations of the double-field coupling dehydrator, and is capable of providing reasonable solutions for matching problems of parameters as well as instructions for subsequent optimizing designing and matching of operation parameters of the double-field coupling dehydrator.

BRIEF DESCRIPTION OF THE DRAWINGS

The invention will be further described with reference to the accompanying drawings, from which the object, technical solutions and beneficial effects of the invention will be clearer.

DETAILED DESCRIPTION OF EMBODIMENTS

The invention will be further described with reference to the accompanying drawings and specific embodiments, from which the present invention will be better understood by those skilled in the art. However, the embodiments are not intended to limit the scope of the invention.

Example 1

Figure 1:
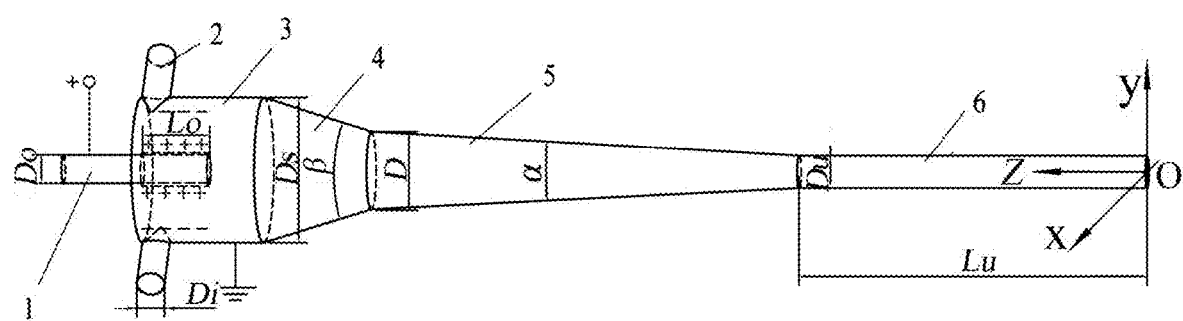
FIG. 1 schematically shows a double-field coupling dehydrator of the invention.

As shown in FIG. 1, this embodiment provides a double-field coupling dehydrator, which includes an overflow pipe 1, a plurality of inlets 2, a straight pipe 3, a first truncated cone 4, a second truncated cone 5 and an underflow pipe 6;

the overflow pipe and the inlets are provided on the straight pipe; the inlets are arranged on an outer wall of the straight pipe and are tangential to a wall of the straight pipe so as to allow a liquid to enter the straight pipe at a certain speed and rotate along an inner wall of the straight pipe; the overflow pipe is arranged along an axis of the straight pipe; a high-voltage electric field is arranged between an outer wall of the overflow pipe in the straight pipe and the inner wall of the straight pipe; the straight pipe, the first truncated cone, the second truncated cone and the underflow pipe are connected sequentially.

The outer wall of the overflow pipe is provided with a positive electrode of a high-voltage power, and the inner wall of the straight pipe is provided with a negative electrode of the high-voltage power, so that the high-voltage electric field is formed between the outer wall of the overflow pipe and the inner wall of the straight pipe.

At least two inlets are provided on the straight pipe in a symmetrical manner.

The straight pipe, the first truncated cone, the second truncated cone and the underflow pipe are connected by welding to form a one-piece structure, and the overflow pipe and the straight pipe are connected via bolts.

A joint between the first and second truncated cones has a nominal diameter D of 2022 mm; the first truncated cone has a first cone angle of 20-22°, and the second truncated cone has a second cone angle α of 5° C.-6° C.

In the double-field coupling dehydrator of this embodiment, a fluid enters the straight pipe at a certain speed and rotates along the inner wall of the straight pipe to generate a rotating fluid. The dehydrator can be placed at a certain angle.

Example 2

Figure 2:
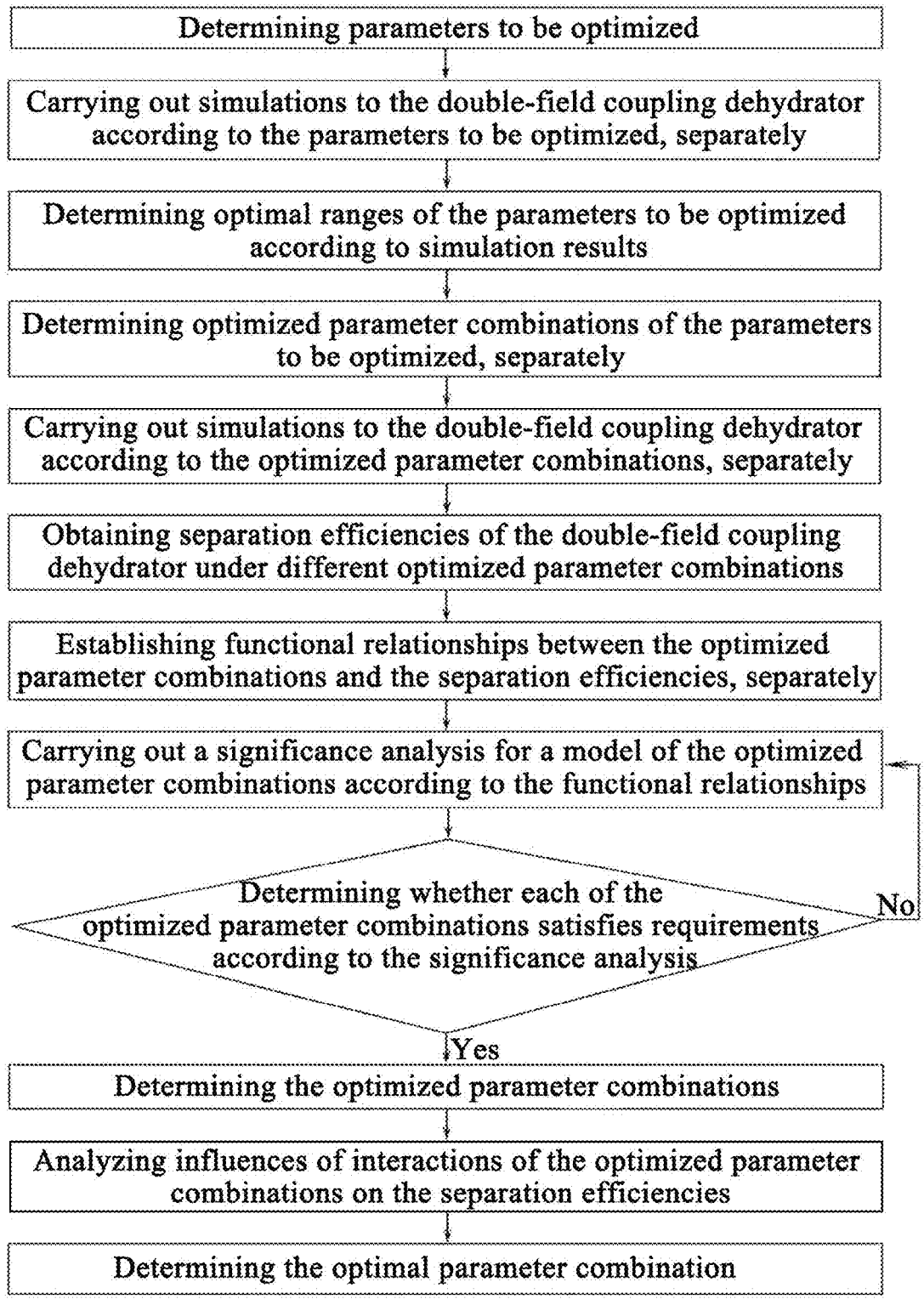
FIG. 2 is a flow chart of a parameter optimization method for the double-field coupling dehydrator of the invention.

As shown in FIG. 2, provided is an a parameter optimization method for a double-field coupling dehydrator, which considers into account both influences of single parameters on the separation efficiency and influences of interactions therebetween on the separation efficiency. Based on numerical simulation results of the double-field coupling dehydrator, these influences are analyzed by a software Design-Expert to obtain an optimal parameter combination of the double-field coupling dehydrator. Specifically, the optimization method includes the following steps.

Parameters to be optimized are determined.

The double-field coupling dehydrator is simulated according to the parameters to be optimized, separately.

Optimal ranges of the parameters to be optimized are determined according to simulation results, i.e., the optimal ranges of the parameters to be optimized are determined by influences on the separation efficiency of the double-field coupling dehydrator when single parameters are changed.

Optimized parameter combinations of the parameters to be optimized are determined, separately; different parameter combinations are determined by the parameters and ranges thereof.

Simulations are carried out to the double-field coupling dehydrator according to the optimized parameter combinations, separately. The separation efficiencies of the double-field coupling dehydrator are obtained via simulation calculations, where different parameter combinations are set as calculation conditions for double-field coupling numerical simulations.

The separation efficiencies of the double-field coupling dehydrator under different optimized parameter combinations are obtained.

Functional relationships between the optimized parameter combinations and the separation efficiencies are established. Functional relationships between input and output factors are established using Design-Expert, where the input factors are the parameters to be optimized and the output factors are the separation efficiencies.

A significance analysis is carried out for models of the optimized parameter combinations according to the functional relationships.

A parameter optimization model is determined; influences of interactions between the parameters on the separation efficiencies are analyzed; and the optimal operating parameter combination is obtained according to the parameter optimization model Whether each of the optimized parameter combinations satisfies requirements is determined according to results of the significance analysis; if not, the method returns to the previous step for the significance analysis of other optimized parameter combinations; if yes, the optimized parameter combination is determined.

The influence of interactions of each of the optimized parameter combinations on the separation efficiencies is analyzed.

The optimal parameter combination is determined.

Example 3

This embodiment illustrates an optimization of a truncated cone of a double-field coupling dehydrator.

In this embodiment, the double-field coupling dehydrator is to be optimized based on waste oil emulsions. Optimization ranges of parameters are obtained by analyzing influences of single factors, and parameter combinations of input factors are designed using Design-Expert. Output factors of the parameter combinations are calculated through a double-field coupling numerical simulation to obtain a parameter optimization model, and an optimal operating parameter combination of the double-field coupling dehydrator is obtained based on the model.

As shown in FIG. 1, the double-field coupling dehydrator includes a straight pipe, a first truncated cone, a second truncated cone and an underflow pipe. The straight pipe is provided with an overflow pipe and two cylinder inlets; the cylinder inlets are tangential to an outer wall of the straight pipe. The outer wall of the overflow pipe is provided with a positive electrode of a high-voltage power, and an inner wall of the straight pipe is provided with a negative electrode of the high-voltage power, so that the high-voltage electric field is formed between the outer wall of the overflow pipe and the inner wall of the straight pipe. The emulsion enters the high-voltage electric field through the inlets, and a rotating flow is generated. Dispersed droplets in the emulsion rapidly coalesce to increase particle sizes thereof under the high-voltage electric field, and then are quickly separated by the rotating flow. A Cartesian coordinate system is established, where an origin is a center of an underflow outlet, and a z axis points to an overflow outlet along a central axis thereof.

Structural parameters of the double-field coupling dehydrator mainly include a nominal diameter $D_i$, a diameter $D_s$ of the straight pipe, a diameter $D_o$ of the overflow outlet, a diameter $D_i$ of the inlets, an entering length $L_o$ of the overflow pipe, a length $L_u$ of the underflow pipe, a diameter $D_u$ of the underflow pipe, a first cone angle $\beta$ and a second cone angle $\alpha$. In this embodiment, $D_s$, $D_o$, $D_i$, $L_o$, $L_u$ and $D_u$ are constant and are 70 mm, 18 mm, 12 mm, 45 mm, 400 mm and 10 mm, respectively.

Optimal ranges of the parameters are determined as follows. The nominal diameter D, the first cone angle $\beta$ and the second cone angle $\alpha$ are set as parameters to be optimized. Calculations for a numerical model of the double-field coupling dehydrator with different structural parameters are carried out by a commercial CFD software, ANSYS Fluent (ANSYS 15.0).

To determine an optimal range of the second cone angle, assuming that the nominal diameter, and the first cone angle α re set as 20° and 26 mm, respectively, and the second cone angle is 2°, 3°, 4°, 5° and 6°, respectively, separation efficiencies corresponding are calculated according to the following equation:

$$E_c = 1 - \frac{\varphi}{\varphi_i}; \quad (1)$$

where when calculating a dehydration rate of the overflow pipe, $\varphi$ is a water volume fraction at the overflow outlet, and $\varphi_i$ is a water volume fraction at the inlets; when calculating a deoiling rate of the underflow pipe, $\varphi$ is an oil volume fraction at the underflow pipe, and $\varphi_i$ is an oil volume fraction at the inlets.

Figure 3:
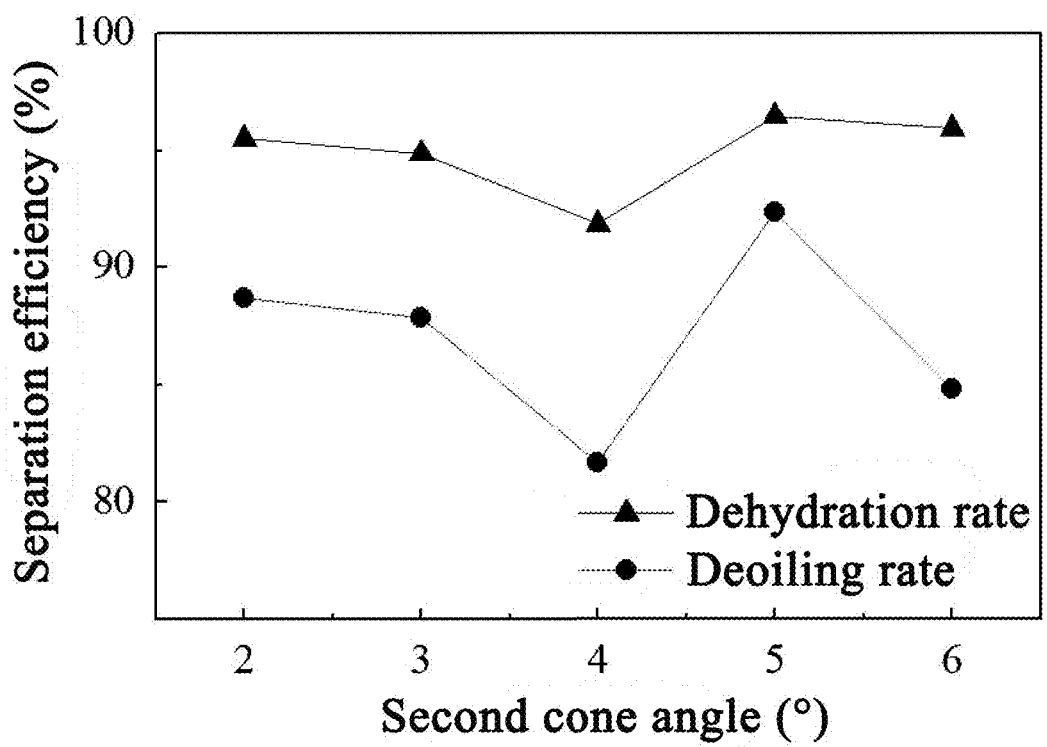
FIG. 3 schematically shows the separation efficiencies of the double-field coupling dehydrator under different second cone angles according to the invention.

As shown in FIG. 3, the double-field coupling dehydrator has different separation efficiencies at different second cone angles. The dehydration rate at the overflow outlet decreases, and then increases and finally decreases. Although the dehydration rate decreases when the second cone angle increases from 5° to 6°, it is higher than those of other three conditions. Therefore, the double-field coupling dehydrator has better dehydration rate at the second cone angle of 5°-6°. The deoiling rate at the underflow outlet has the same changing trend as the dehydration rate at the overflow outlet, that is, a larger deoiling rate is achieved at the second cone angle of 5°-6°. In conclusion, the optimal range of the second cone angle of the double-field coupling dehydrator is 5°-6°.

Figure 4:
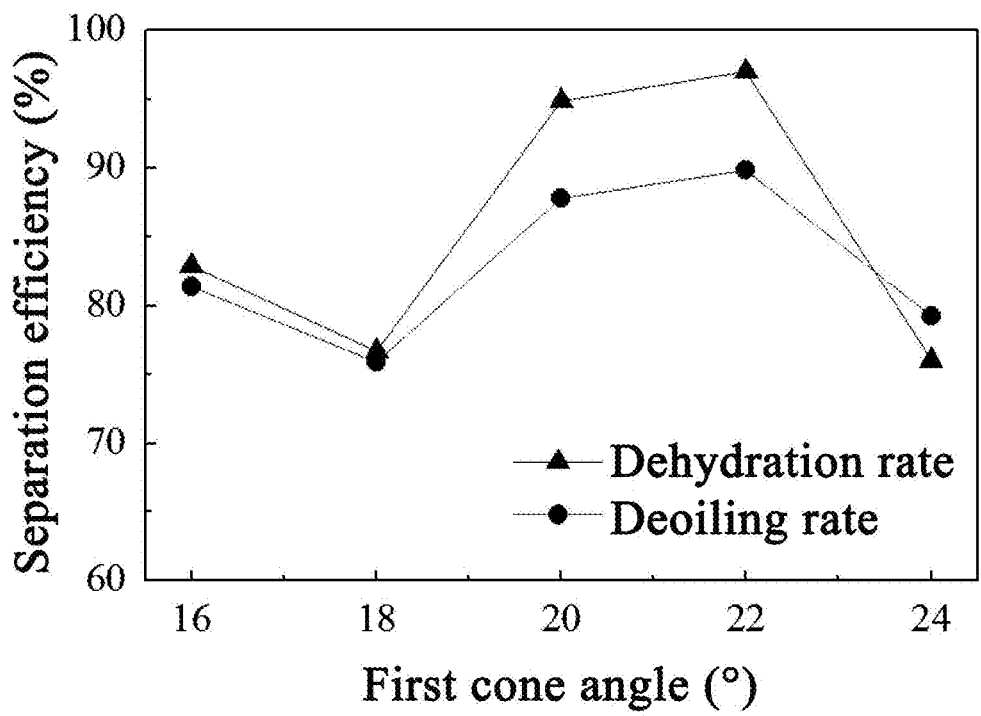
FIG. 4 schematically shows the separation efficiencies of the double-field coupling dehydrator under different first cone angles according to the invention.

To determine an optimal range of the first cone angle, it is assumed that the second cone angle α nd the nominal diameter are constant and are 3° and 26 mm, respectively; the voltage amplitude is 0 and 11 kV, respectively; and the first cone angle is 16°, 18°, 20°, 22° and 24°, respectively. The separation efficiencies of the dehydrator at different first cone angles are shown in FIG. 4. It can be seen that the dehydration rate at the overflow outlet at the first cone angle of 20°-22° is obviously higher than that of other first cone angles. Besides, the deoiling rate at the underflow outlet has a basically same changing trend with the dehydration rate at the overflow outlet. Therefore, the optimal range of the first cone angle is 20°-22°.

Figure 5:
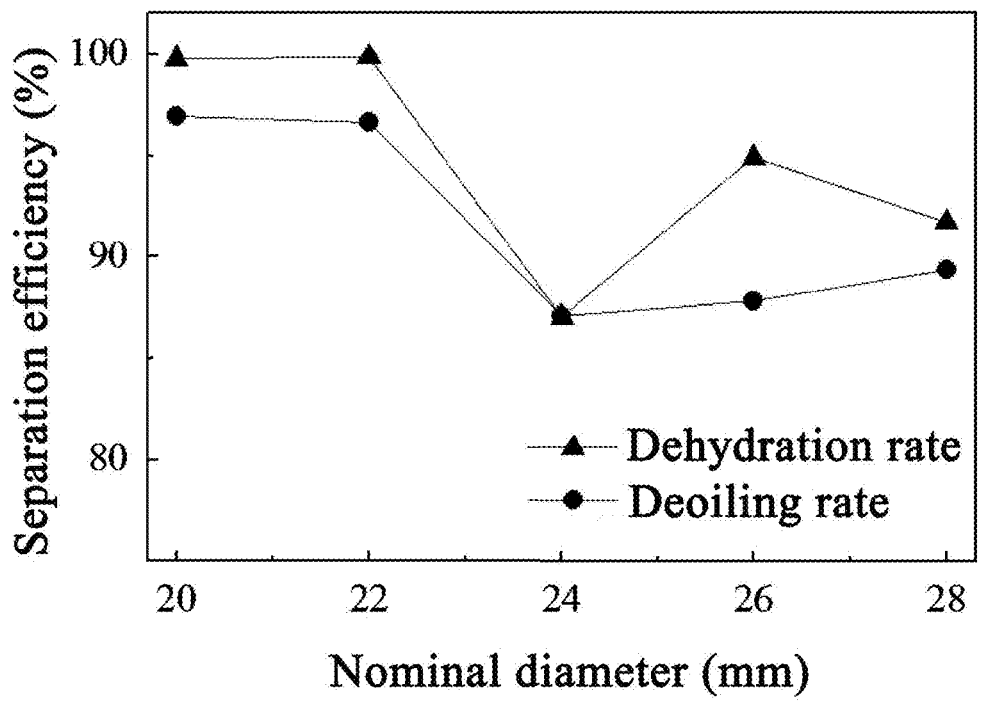
FIG. 5 schematically shows the separation efficiencies of the double-field coupling dehydrator under different nominal diameters according to the invention.

To determine an optimal range of the nominal diameter, it is assumed that the first and second cone angles are constant and are 3° and 20°, respectively; the voltage amplitude is 0 and 11 kV, respectively; and the nominal diameter is 20, 22, 24, 26 and 28 mm, respectively. The separation efficiencies of the dehydrator at different nominal diameters are shown in FIG. 5. It is concluded that the dehydration rate at the overflow outlet is higher when the nominal diameter is 20-22 mm. The deoiling rates at the underflow outlet are generally the same when the nominal diameter is 20-22 mm, and are larger than the deoiling rates at the underflow outlet when the nominal diameter is 22-28 mm. In conclusion, the optimal range of the nominal diameter is 20-22 mm.

The parameter combinations are designed and the separation efficiencies thereof are calculated in the following steps.

It can be seen from the analysis results of influences of the single factors that the optimal ranges of the first and second cone angles and the nominal diameter are 20°-22°, 5°-6° and 20-22 mm, respectively. Design-Expert is employed to design parameter combinations of input factors, and at the same time a numerical method is applied to obtain output factors under different experimental conditions, where the output factors are the dehydration rate at the overflow outlet and the deoiling rate at the underflow outlet; the input factors are the first and second cone angles and the nominal diameter. The results are shown in Table 1.

TABLE 1

Parameter combinations and simulation calculation results

| No. | Coded A | Coded B | Coded C | Dewatering rate/% | Deoiling rate/% |
|---|---|---|---|---|---|
| 1 | −1 | −1 | 0 | 96.25 | 89.49 |
| 2 | 1 | −1 | 0 | 95.37 | 77.52 |
| 3 | −1 | 1 | 0 | 95.04 | 87.87 |
| 4 | 1 | 1 | 0 | 95.76 | 82.13 |
| 5 | −1 | 0 | −1 | 95.78 | 90.69 |
| 6 | 1 | 0 | −1 | 94.74 | 90.05 |
| 7 | −1 | 0 | 1 | 95.50 | 94.16 |
| 8 | 1 | 0 | 1 | 95.51 | 77.25 |
| 9 | 0 | −1 | −1 | 96.44 | 83.96 |
| 10 | 0 | 1 | −1 | 95.24 | 85.17 |
| 11 | 0 | −1 | 1 | 96.27 | 94.47 |
| 12 | 0 | 1 | 1 | 95.74 | 86.58 |
| 13 | 0 | 0 | 0 | 95.94 | 80.89 |
| 14 | 0 | 0 | 0 | 95.94 | 80.89 |
| 15 | 0 | 0 | 0 | 95.94 | 80.89 |
| 16 | 0 | 0 | 0 | 95.94 | 80.89 |
| 17 | 0 | 0 | 0 | 95.94 | 80.89 |

Design-Expert 8.0 is employed to analyze the data in Table 1, and a multiple quadratic regression model is established as follows:

$$E_{dw}=266.26-8.798x_1 12.43x_2-1.197x_3+0.799x_1x_2+0.528x_1x_3+0.166x_2x_3+0.101x_2^2-0.12x_3^2; \quad (2)$$

$$E_{do}=1716.68+11.68x_1-29.9x_2-126.5x_3+3.11x_1x_2-8.13x_1x_3-2.28x_2x_3+7.72x_1^2+1.43x_2^2+5.22x_3^2; \quad (3)$$

where $x_1$, $x_2$ and $x_3$ correspond to $\alpha$, $\beta$ and D, respectively; $E_{dw}$ is the dehydration rate, %; $E_{do}$ is the deoiling rate, %. The variance analysis of the multiple quadratic regression model is shown in Tables 2 and 3. It can be seen that F-value of the model is 11.74 and 4.61, respectively, and corresponding p-value is 0.19% and 2.81%, which are all less than 5%. The complex correlation coefficients of the two models are 0.979 and 0.8557, respectively, indicating that both models have higher significance.

TABLE 2

Variance analysis on dehydration rate optimization model

| Source | SS | DF | MS | F-value | P-value |
|---|---|---|---|---|---|
| Model | 3.02 | 9 | 0.34 | 11.74 | 0.0019 |
| A-α | 0.18 | 1 | 0.18 | 6.13 | 0.0425 |
| B-β | 0.81 | 1 | 0.81 | 28.33 | 0.0011 |
| C-D | 0.08 | 1 | 0.08 | 2.94 | 0.1299 |
| AB | 0.64 | 1 | 0.64 | 22.32 | 0.0021 |
| AC | 0.28 | 1 | 0.28 | 9.76 | 0.0168 |
| BC | 0.11 | 1 | 0.11 | .3.86 | 0.0903 |
| A$^2$ | 0.82 | 1 | 0.82 | 28.53 | 0.0011 |
| B$^2$ | 0.04 | 1 | 0.04 | 1.50 | 0.2613 |
| C$^2$ | 0.06 | 1 | 0.06 | 2.17 | 0.1846 |
| Residual | 0.20 | 7 | 0.03 | — | — |
| Lack of Fit | 0.20 | 3 | 0.07 | — | — |
| Pure Error | 0 | 4 | 0 | — | — |
| Cor Total | 3.22 | 16 | — | — | — |
| R$^2$ | — | — | 0.9379 | — | — |

TABLE 3

Variance analysis on deoiling rate optimization model

| Source | SS | DF | MS | F-value | P-value |
|---|---|---|---|---|---|
| Model | 404.13 | 9 | 44.90 | 4.61 | 0.0281 |
| A-α | 155.41 | 1 | 155.41 | 15.96 | 0.0052 |
| B-β | 1.70 | 1 | 1.70 | 0.17 | 0.6887 |
| C-D | 0.84 | 1 | 0.84 | 0.09 | 0.7777 |
| AB | 9.70 | 1 | 9.70 | 1.00 | 0.3515 |
| AC | 66.18 | 1 | 66.18 | 6.80 | 0.0351 |
| BC | 20.74 | 1 | 20.74 | 2.13 | 0.1849 |
| A$^2$ | 15.70 | 1 | 15.70 | 1.61 | 0.2449 |
| B$^2$ | 8.63 | 1 | 8.63 | 0.89 | 0.3778 |
| C$^2$ | 114.88 | 1 | 114.888 | 11.80 | 0.0109 |
| Residual | 68.17 | 7 | 9.74 | — | — |
| Lack of Fit | 68.17 | 3 | 22.72 | — | — |
| Pure Error | 0 | 4 | 0 | — | — |
| Cor Total | 472.3018 | 16 | — | — | — |
| R$^2$ | — | — | 0.8557 | — | — | where Source is the variance source; SS is the sum of squared deviations; DF is the degree of freedom; MS is the mean square; F-value is the F value of F-test; p-value is the P value of the F-test; Model is the model; A-α indicates that the second cone angle α is expressed by variable A; B-β indicates that the first cone angle is expressed by variable B; C-D indicates that the nominal diameter D is expressed by variable C; AB is the product of variables A and B; AC is the product of variables A and C; BC is the product of variables B and C; A$^2$ is the square of variable A; B$^2$ is the square of variable B; C$^2$ is the square of variable C; Residual is the residual; Lack of Fit is the lack of fit; Pure Error is the error; Cor Total is the total regression; R$^2$ is the correlation coefficient; Coded is the coding; Dehydration is the dehydration rate; and Deoiling rate is the deoiling rate.

Figure 6:
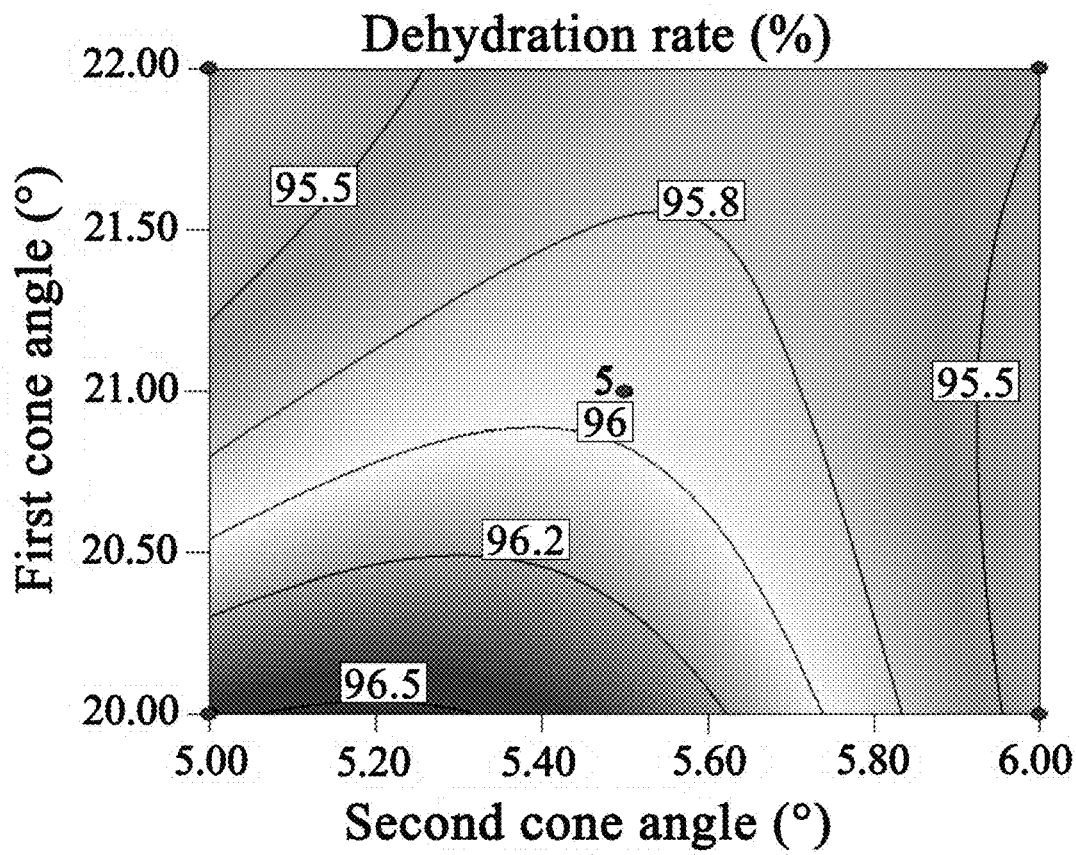
FIG. 6 schematically shows an influence of an interaction between the first and second cone angles on a dehydration rate according to the invention.
Figure 7:
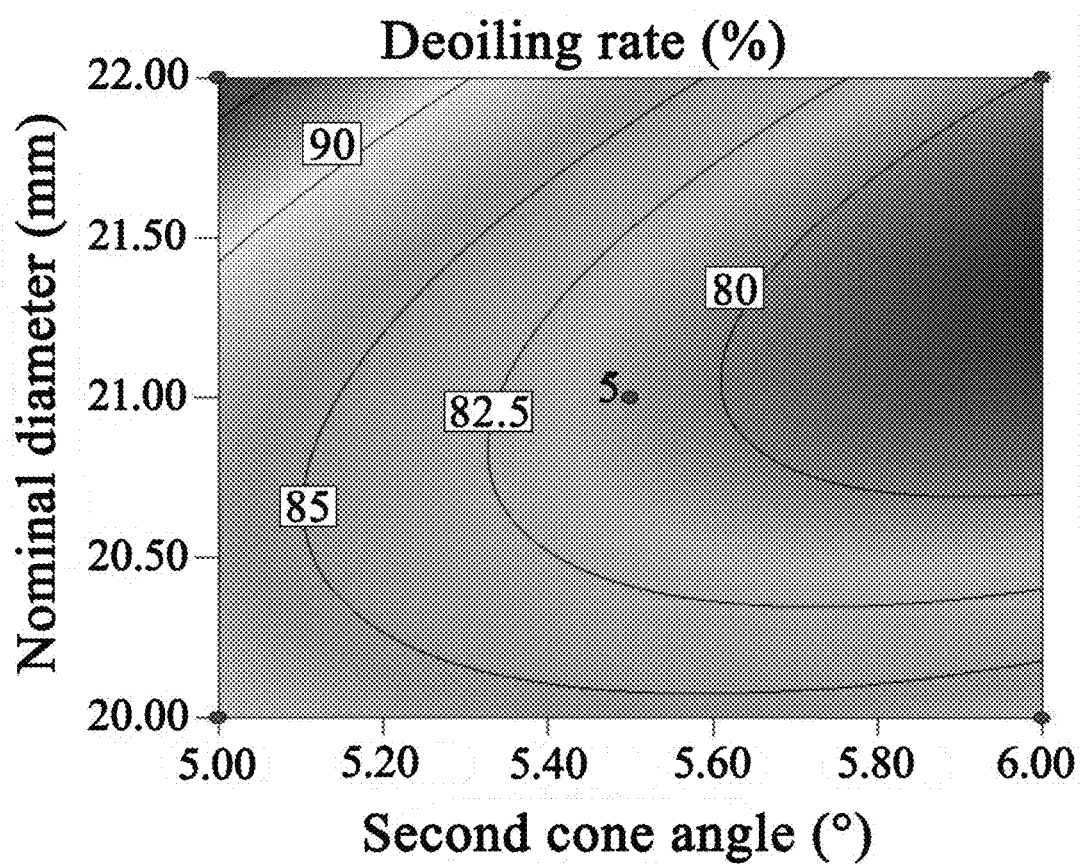
FIG. 7 schematically shows an influence of an interaction between the second cone angle α nd the nominal diameter on a deoiling rate according to the invention.

To study the influence of interactions between respective factors on the separation efficiencies, the models are analyzed to obtain a response contour map, as shown in FIGS. 6 and 7. As shown in FIG. 6, the dehydration rate at the overflow outlet increases when the first and second cone angles decrease at the same time; and when the second cone angle is 5°, the first cone angle decreases from 22° to 20°, the dehydration increases from 95.03% to 96.24%. As shown in FIG. 7, the deoiling rate at the underflow outlet obviously increases when the nominal diameter increases and the second cone angle decreases at the same time; and when the second cone angle is 5°, and the nominal diameter increases from 20 mm to 22 mm, the deoiling rate increases from 90.69% to 94.16%.

An optimal operating parameter combination is obtained when the dehydration rate and deoiling rate of the dehydrator reach the maximum at the same time, and the model is solved to obtain the optimization result. It is shown in the result that the optimal values of the first and second cone angles and the nominal diameter are 20°, 5.09° and 22 mm, and the dehydration and deoiling rates of the dehydrator are 96.46% and 97.05%, respectively.

Described above are merely preferred embodiments of the invention, which are intended to fully describe the invention, and are not intended to limit the scope of the invention. Any equivalent replacements or changes made by those skilled in the art without departing from the spirit of the invention should fall within the scope of the invention.

What is claimed is:

1. A method of parameter optimization for a double-field coupling dehydrator, the double-field coupling dehydrator comprising an overflow pipe, a plurality of inlets, a straight pipe, a first truncated cone, a second truncated cone, and an underflow pipe; the overflow pipe and the plurality of inlets being provided on the straight pipe; the inlets being arranged on an outer wall of the straight pipe and are tangential to a wall of the straight pipe so as to allow a liquid to enter the straight pipe at a certain speed and rotate along an inner wall of the straight pipe; the overflow pipe being arranged along an axis of the straight pipe; a high-voltage electric field being arranged between an outer wall of the overflow pipe in the straight pipe and the inner wall of the straight pipe; and the straight pipe, the first truncated cone, the second truncated cone and the underflow pipe being connected sequentially;

a joint between the first truncated cone and the second truncated cone having a nominal diameter D of 20-22 mm; the first truncated cone having a first cone angle $\beta$ of 20°-22°, and the second truncated cone having a second cone angle $\alpha$ of 5°-6°;

the method comprising:

determining parameters to be optimized;

simulating the double-field coupling dehydrator according to determined parameters individually;

determining an optimal range of individual parameters according to simulation results;

determining combinations of optimized parameters;

simulating the double-field coupling dehydrator according to determined parameter combinations individually;

obtaining separation efficiencies of the double-field coupling dehydrator under individual parameter combinations within the optimal range;

determining an optimal parameter combination according to the separation efficiencies of the double-field coupling dehydrator; wherein a multiple quadratic regression model of functional relationships between the optimized parameter combinations and the separation efficiencies is established and calculated according to the following equations:

$E_{dw} = 266.26 - 8.798x_1 12.43x_2 - 1.197x_3 + 0.799x_1x_2 + 0.528x_1x_3 + 0.166x_2x_3 + 0.101x_2^2 - 0.12x_3^2;$ $E_{do} = 1716.68 + 11.68x_1 - 29.9x_2 - 126.5x_3 + 3.11x_1x_2 - 8.13x_1x_3 - 2.28x_2x_3 + 7.72x_1^2 + 1.43x_2^2 + 5.22x_3^2;$ wherein $x_1$, $x_2$ and $x_3$ correspond to $\alpha$, $\beta$ and D, respectively; $E_{dw}$ is dehydration rate %; and $E_{do}$ is deoiling rate %; and an optimal condition is that the dehydration rate and deoiling rate of the double-field coupling dehydrator are maximal at the same time; and obtaining the optimal parameter combination.

2. The method of claim 1, wherein the outer wall of the overflow pipe is provided with a positive electrode of a high-voltage power, and the inner wall of the straight pipe is provided with a negative electrode of the high-voltage power, so that the high-voltage electric field is formed between the outer wall of the overflow pipe and the inner wall of the straight pipe.

3. The method of claim 1, wherein at least two inlets are provided on the straight pipe in a symmetrical manner.

4. The method of claim 1, wherein the straight pipe, the first truncated cone, the second truncated cone and the underflow pipe are connected by welding to form a one-piece structure; and the overflow pipe and the straight pipe are connected via bolts.

5. The method of claim 1, wherein the step of determining the optimal parameter combination according to the separation efficiencies of the double-field coupling dehydrator comprises the following steps:

carrying out a significance analysis for the optimized parameter combinations according to the functional relationships;

determining whether one of the optimized parameter combinations satisfies requirements according to significance analysis results; if not, returning to previous step to carry out the significance analysis for another one of the optimized parameter combinations; if yes, then determining the optimized parameter combinations; and analyzing influences of interactions of the optimized parameter combinations on the separation efficiencies to determine the optimal parameter combination.

* * * * *